United States Patent [19]

Svenningsen

[11] 4,376,378

[45] Mar. 15, 1983

[54] HEAT EXCHANGER

[75] Inventor: Ole N. Svenningsen, Odense, Denmark

[73] Assignee: Volund Vaskerimaskiner A/S, Tommerup, Denmark

[21] Appl. No.: 206,984

[22] Filed: Nov. 14, 1980

[30] Foreign Application Priority Data

Dec. 6, 1979 [DK] Denmark ............................. 5191/79

[51] Int. Cl.³ ..................... D06F 21/04; D06F 39/04; D06F 39/08
[52] U.S. Cl. ........................................ 68/16; 68/207
[58] Field of Search .................... 68/16, 58, 207, 15; 134/105, 107

[56] References Cited

U.S. PATENT DOCUMENTS 757,011 4/1904 Barbe ............................. 68/15 X
2,701,956 2/1955 Duquenne ............................. 68/16

Primary Examiner—Philip R. Coe
Attorney, Agent, or Firm—Holman & Stern

[57] ABSTRACT

A drum type washing machine having a double-section tank to provide a space between the sections through which works water is passed so that the works water is preheated by the water contained in the tank before this latter water is discharged to the sewer system. It is thus possible to recover and save thermal energy.

7 Claims, 1 Drawing Figure

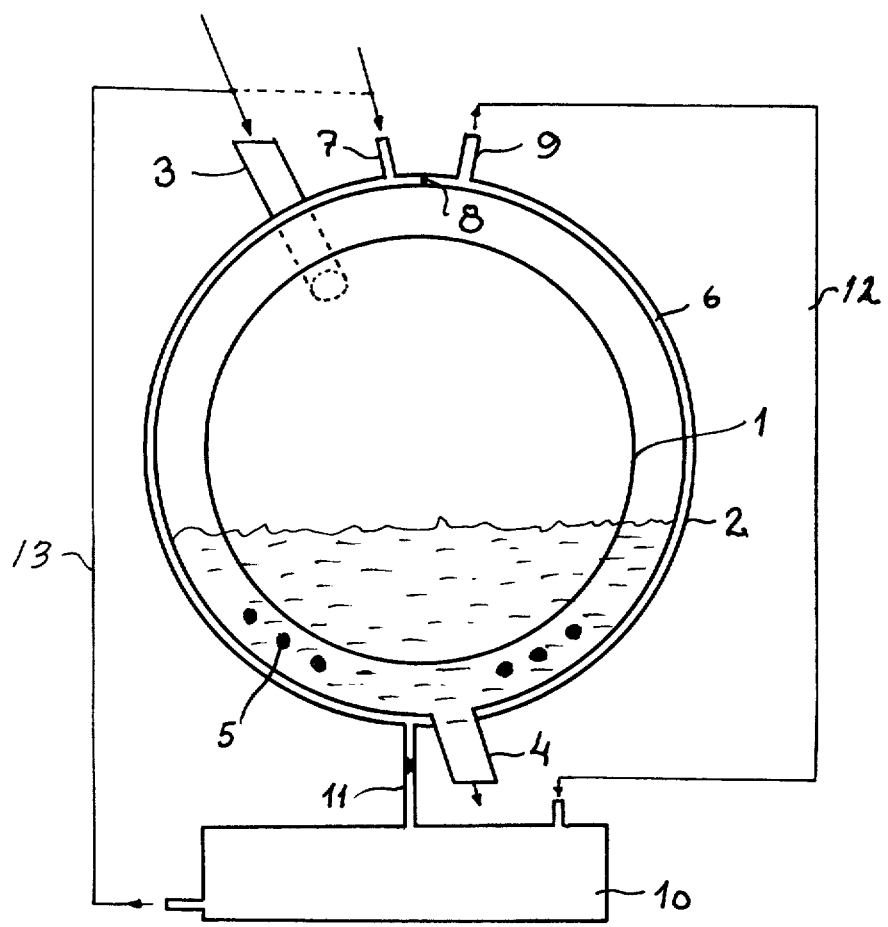

HEAT EXCHANGER

BACKGROUND OF THE INVENTION

1. Field of the Invention

The invention relates to a drum type washing machine comprising a perforated washing drum being suspended for rotation within a cylinder-shaped tank having at least one inlet for inflow of cold water and one outlet for waste washing water, and may furthermore incorporate one or several heating elements intended for heating of the supplied cold water.

2. Description of the Prior Art

It is in such washing machines known that the discharged waste washing water may be directed through a separate heat exchanger in such a manner that part of the heat conveyed to the discharged water can be restored. Separate heat exchangers of this type are, however, expensive compared to the quantity of heat they may restore. Moreover a separate heat exchanger of traditional construction will often be choked up by fibres and particles worn off the laundry during the washing process which will result in a reduction of the efficiency of the heat exchanger and require frequent time-consuming cleaning.

BRIEF SUMMARY OF THE INVENTION

According to the invention the tank is double-sectioned, and the space between the two sections of the tank in operational position of the drum washing machine at the top is connected to an inlet for cold water, and at the other side of a partition connecting the tank sections is provided with an outlet for the preheated works water.

This construction produces several advantages. Cold water can be directed through the tank, while the inner section of the tank contains heated water or waste washing water and will thus be preheated simultaneously with the cooling of the discharged water in the tank before it is conveyed to the sewer. The heat exchanging effect achieved in this manner has proved more efficient than that, which is possible via a separate heat exchanger, and the risk of choking will naturally not occur as in the case of a separate heat exchanger.

It is according to the invention advantageous that the space between the two tank sections at the bottom is provided with a drain stub, which makes it possible to empty the tank space entirely of water. The tank can thus function as an effective insulator, when not operating as a heat exchanger.

The tank space may serve to store the preheated works water, but a still more efficient cooling of the washing water in the tank is according to the invention achieved in that the washing machine comprises a storing receptacle for the preheated works water.

BRIEF DESCRIPTION OF THE DRAWING

The invention will now be described in detail with reference to the attached drawing showing a vertical section of a drum type washing machine according to the invention.

DETAILED DESCRIPTION

The machine of this invention incorporates a perforated washing drum 1 suspended for rotation within a cylinder-shaped tank 2. The tank 2 has inlet 3 for cold water and discharge 4 for waste washing water, and contains heating elements 5 for heating of the supplied cold water.

Inflow and discharge of water to and from the tank, operation of heating elements 5 for heating the water, and operation of the drum are controlled by a programme unit (not shown) in the usual manner.

The tank 2 is double-sectioned, or double walled and the space 6 between the two sections of the tank is at the top connected to an inlet 7 for cold works water. Also at top, but at the other side of the partition 8 connecting the tank sections, the tank space 6 is connected to an outlet 9 for preheated works water. This outlet is connected by a conduit 12 to a storing receptacle 10, from which the preheated works water can be directed through conduit 13 to the water inlet 3 of the tank 2.

At the bottom of the tank space 6 is a draining stub 11, through which the tank space 6 can be entirely emptied of water.

Inflow and discharge of water to and from the tank space 6 and the storing receptacle 10 is controlled by the already mentioned programme unit (not shown).

Before heated water is conveyed from the tank 2 to the sewer, cold water, or preheated water from the storing receptacle, is directed through the tank space 6. Due to the partition 8 the cold water will be forced all the way down around the bottom of the tank which is in contact on its inner surface with the hot washing and waste washing water. Thereby the works water in the tank space 6 will be preheated by heat conducted through the inner section, or wall, of tank 2, and the waste washing water in the tank space 2 will be cooled, before it passes on to the sewer system. This results in part of the heat in the tank being recovered, and the preheated works water in receptacle 10 can be used for filling the tank 2 the next time a filling with hot water is desirable.

Certain textiles, e.g. permanent-press fabrics, require that the cooling after the washing process takes place slowly. This is according to known washing machine procedures achieved by cold water being fed to the washing water, to ensure a slow cooling. In the above described washing machine this cooling of the washing water is done by the washing water transfering heat to the water in the tank space 6, with the result that the washing machine of the invention will operate with a lower consumption of water than known washing machine types.

While the heating elements 5 induce heat to the water in the tank 2, the tank space 6 can be emptied of water through the draining stub 11 and thereby act as an insulator and reduce the period of heating.

I claim:

1. In a drum type washing machine wherein a perforated cylindrical washing drum is suspended for rotation about a substantially horizontal axis within a cylinder-shaped tank, said tank having at least one inlet for cold water and one outlet for discharging waste washing water, and heating means for heating the water within said tank, the improvement comprising, said tank being constructed as a double-walled tank to provide an inner and an outer wall and a space between the two walls, an inlet and an outlet near the top of the tank through the outer wall thereof communicating with said space, and a partition between said inner and outer walls within said space near the top of said tank and between said inlet and outlet so that water entering the inlet to said space passes through said space around the bottom of said tank to the outlet to said space.

2. Drum washing machine according to claim 1 wherein the space between the two tank walls at the bottom is provided with a drain stub through said outer wall.

3. Drum washing machine according to claim 1 and further comprising a storing receptacle, an inlet and an outlet to said storing receptacle, a first conduit connecting said storing receptacle outlet to said cold water inlet to said tank, and a second conduit connecting said outlet for said space between said inner and outer walls to said storing receptacle inlet.

4. Drum washing machine according to claim 3 wherein a drain line is provided at the bottom of said tank through said outer wall thereof communicating at one end with said space between the inner and outer walls of the tank, and at the other end with said storing receptacle.

5. Drum washing machine according to claims 3 or 4 wherein said first conduit is also connected to said inlet to said space between said inner and outer walls of the tank.

6. Drum washing machine according to claim 5 wherein said heating means comprises heating elements disposed within said tank near the bottom thereof between said tank and said drum.

7. A drum washing machine according to claim 1 wherein a conduit means is provided connecting said outlet to said space between said inner and outer walls to said water inlet to said tank.

* * * * *